United States Patent
Kim et al.

(10) Patent No.: US 9,925,553 B2
(45) Date of Patent: Mar. 27, 2018

(54) METHOD FOR FORMING BEZEL PATTERN OF DISPLAY SUBSTRATE

(71) Applicant: LG CHEM, LTD., Seoul (KR)

(72) Inventors: Jooyeon Kim, Daejeon (KR); Seung Heon Lee, Daejeon (KR); Jiehyun Seong, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/625,332

(22) Filed: Feb. 18, 2015

(65) Prior Publication Data

US 2015/0158046 A1  Jun. 11, 2015

Related U.S. Application Data

(62) Division of application No. 14/365,010, filed as application No. PCT/KR2013/006007 on Jul. 5, 2013.

(30) Foreign Application Priority Data

Jul. 11, 2012 (KR) .................. 10-2012-0075670

(51) Int. Cl.
*B05B 15/04* (2006.01)
*G02F 1/1333* (2006.01)
*B41M 3/00* (2006.01)
*G06F 1/16* (2006.01)

(52) U.S. Cl.
CPC ........... *B05B 15/045* (2013.01); *B41M 3/003* (2013.01); *G02F 1/133308* (2013.01); *G06F 1/1637* (2013.01); *G02F 1/133351* (2013.01); *G02F 2001/13332* (2013.01); *Y10T 428/24488* (2015.01); *Y10T 428/24612* (2015.01)

(58) Field of Classification Search
None
See application file for complete search history.

(56) References Cited

U.S. PATENT DOCUMENTS

| 2,547,674 | A | * | 4/1951 | Tobey | B41N 1/241 101/127.1 |
| 5,480,700 | A | * | 1/1996 | Kume | C09J 7/026 283/81 |
| 5,559,074 | A | * | 9/1996 | Watanabe | B41N 1/245 33/563 |
| 2003/0194523 | A1 | * | 10/2003 | Kume | G09F 3/10 428/40.1 |
| 2004/0142141 | A1 | * | 7/2004 | Jauregui | A47G 27/0475 428/95 |

(Continued)

FOREIGN PATENT DOCUMENTS

| JP | 06-196845 | 7/1994 |
| JP | 06196845 | 7/1994 |

(Continued)

OTHER PUBLICATIONS

JP 06-196845 Machine Translation of reference provided in the parent U.S. Appl. No. 14/365,010.*

*Primary Examiner* — Laura C Powers
(74) *Attorney, Agent, or Firm* — Dentons US LLP

(57) ABSTRACT

Provided is a method for forming a bezel pattern of a display panel, the method including: attaching a release film including a non-pattern portion to a panel; printing at least one bezel pattern by applying an ink composition on the panel; and removing the release film from the panel.

7 Claims, 7 Drawing Sheets

(56) References Cited

U.S. PATENT DOCUMENTS

| | | | |
|---|---|---|---|
| 2005/0000642 A1* | 1/2005 | Everaerts | C09J 7/0242 |
| | | | 156/273.1 |
| 2005/0244995 A1 | 11/2005 | Fukuchi et al. | |
| 2007/0259293 A1 | 11/2007 | Shin et al. | |
| 2009/0053485 A1 | 2/2009 | Royals et al. | |
| 2009/0303195 A1 | 12/2009 | Yamato et al. | |
| 2009/0305503 A1 | 12/2009 | Sakamoto et al. | |
| 2010/0090978 A1 | 4/2010 | Nishikawa et al. | |
| 2012/0048828 A1 | 3/2012 | Kim et al. | |
| 2012/0319116 A1 | 12/2012 | Ono et al. | |
| 2013/0063371 A1 | 3/2013 | Lee et al. | |

FOREIGN PATENT DOCUMENTS

| | | |
|---|---|---|
| JP | 2007-296509 A | 11/2007 |
| JP | 2011-14286 A | 6/2011 |
| KR | 100724817 | 6/2007 |
| KR | 1020080090694 | 10/2008 |
| KR | 1020120019647 | 3/2012 |
| KR | 1020120020932 | 3/2012 |

\* cited by examiner

[Fig. 1]
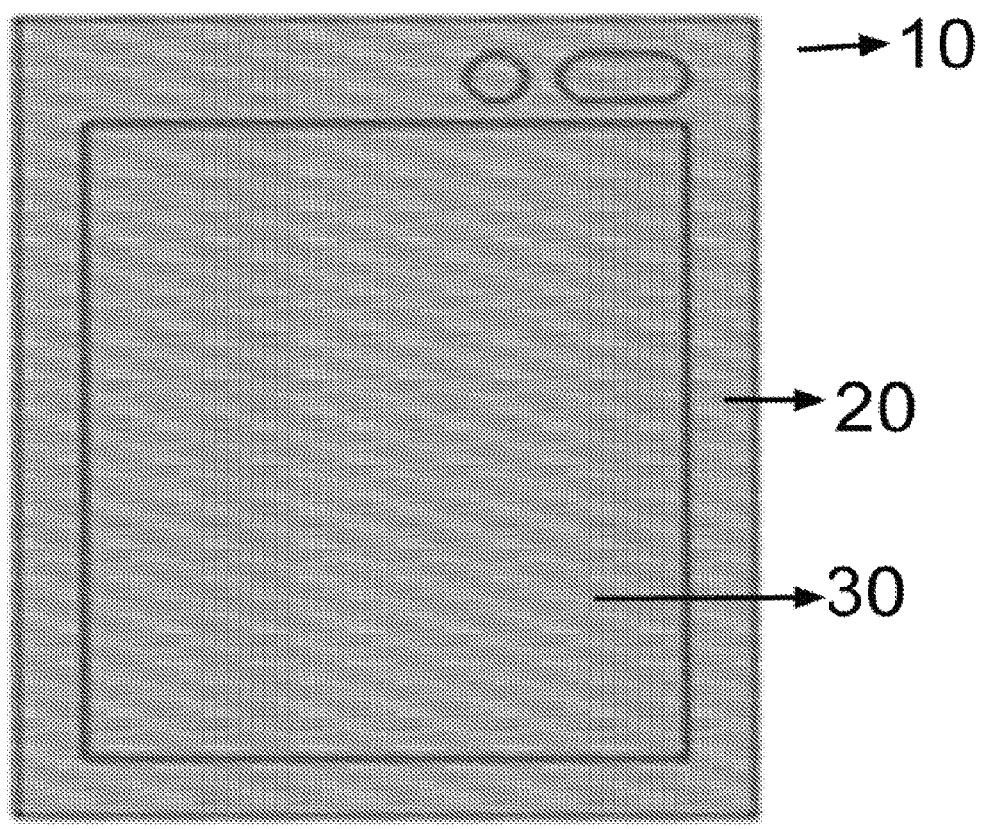

[Fig. 2]
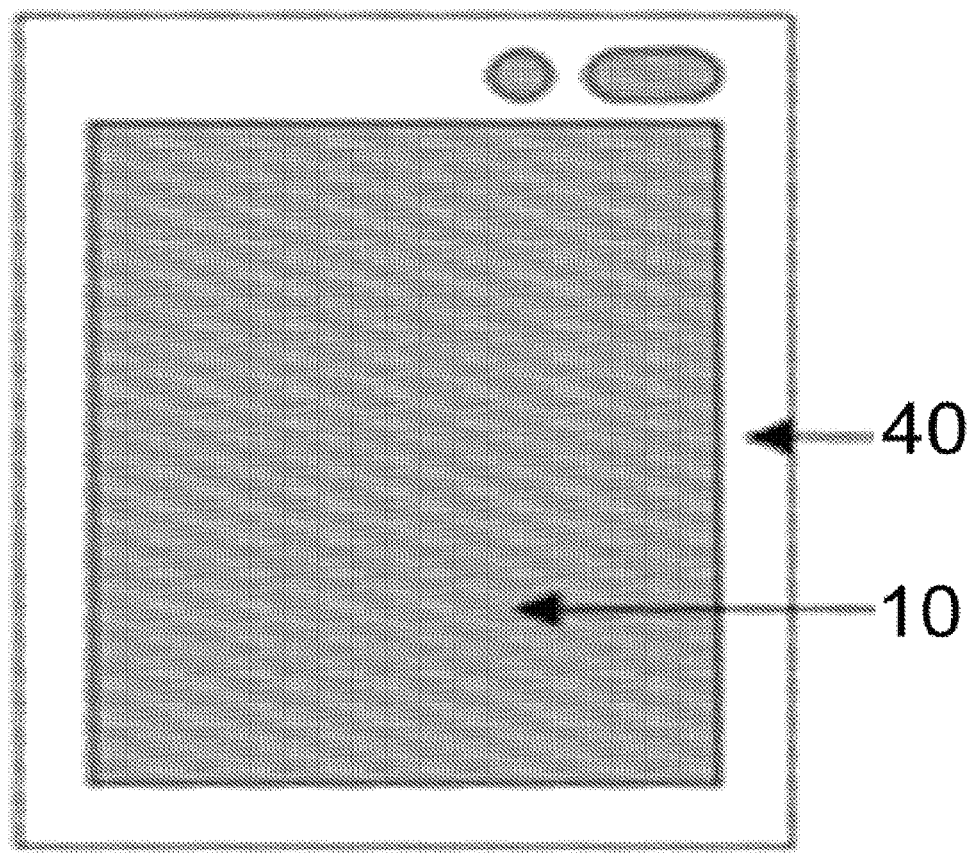

[Fig. 3]
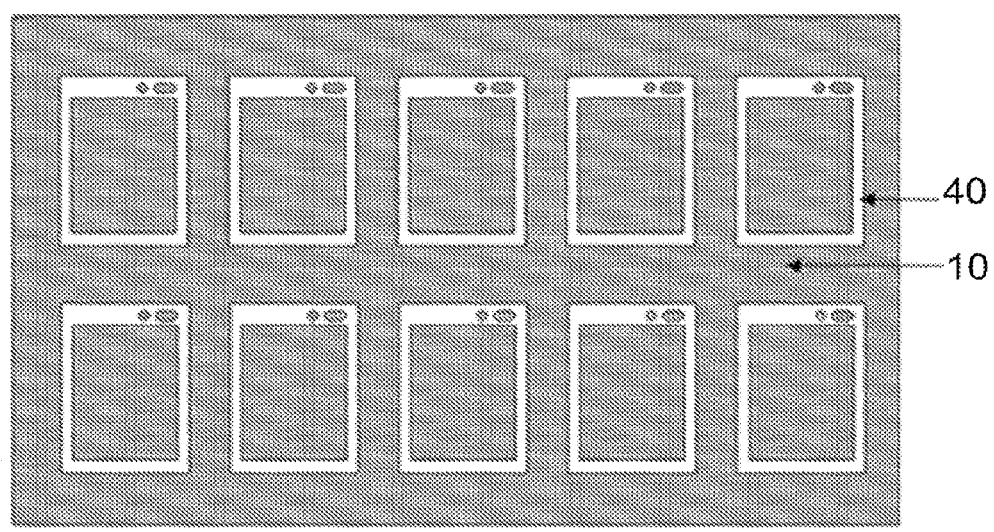

【Fig. 4】
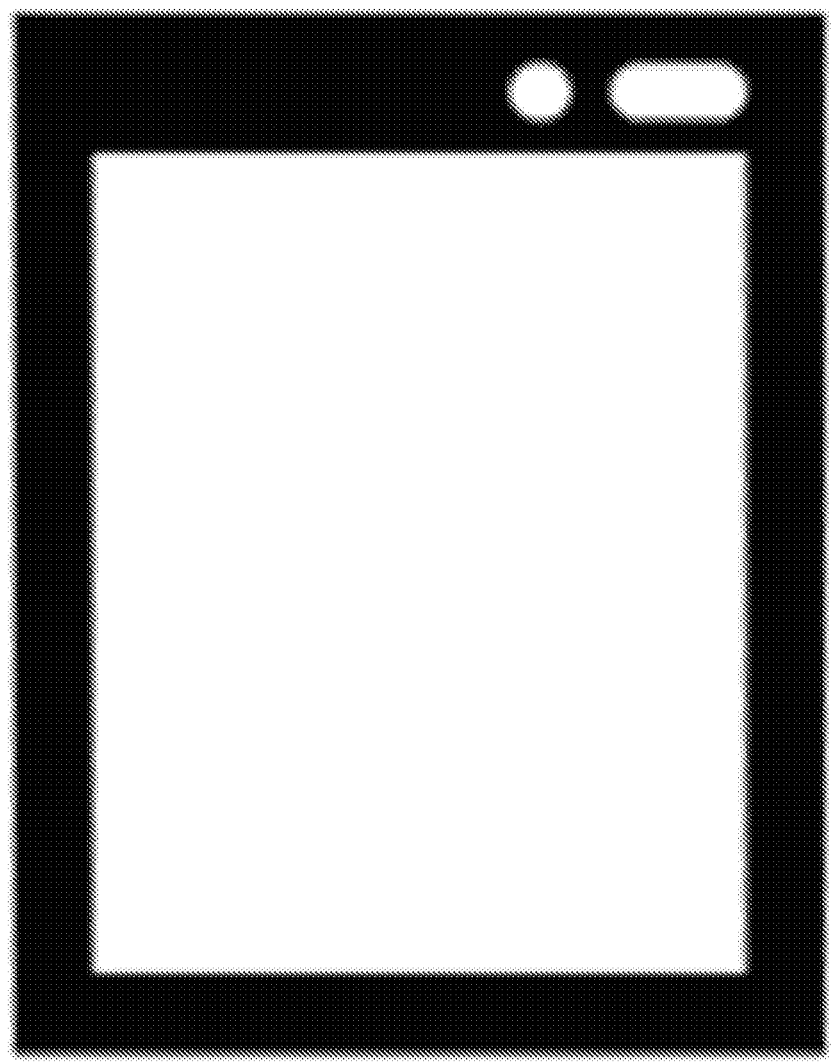

[Fig. 5]
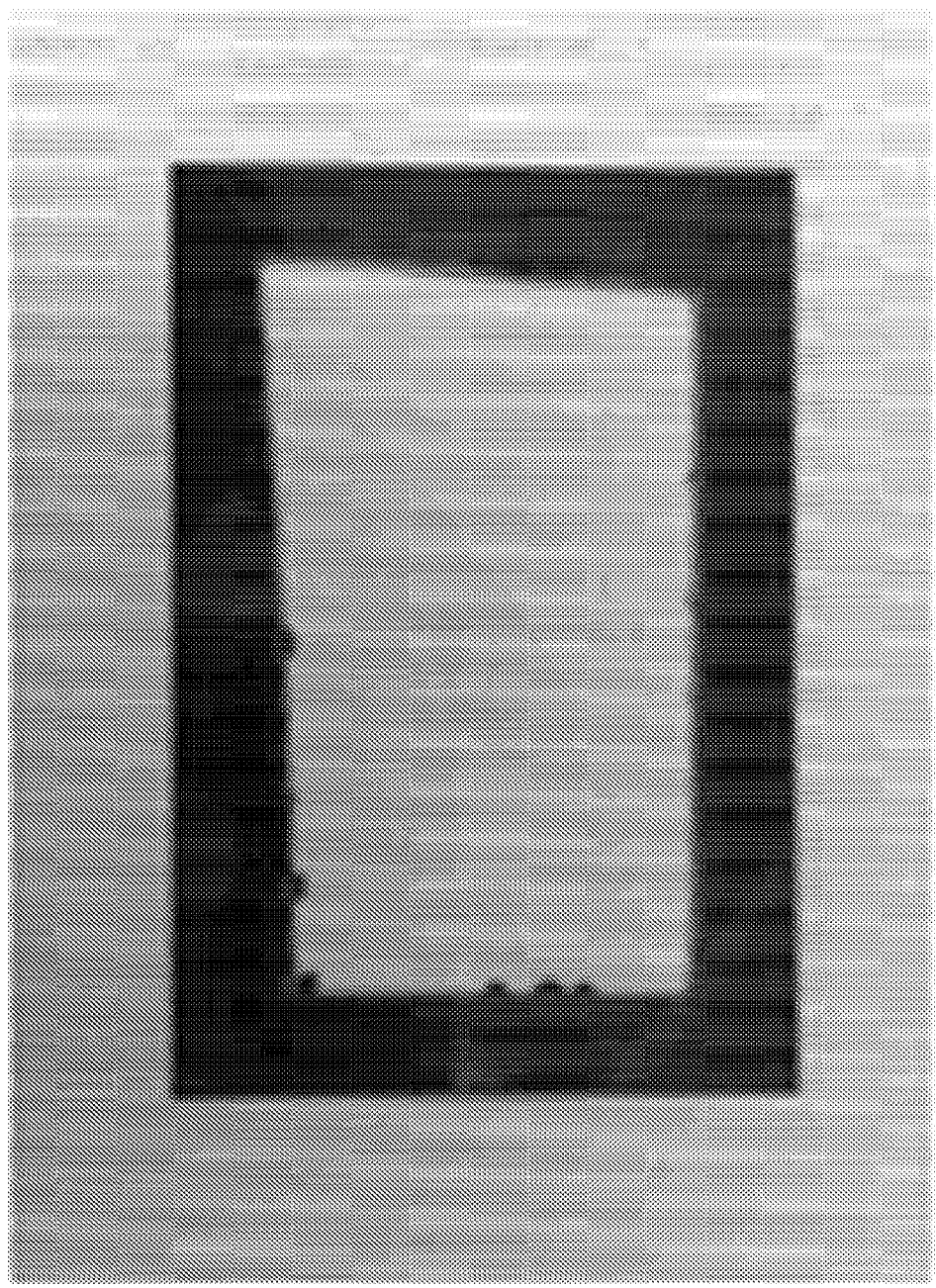

[Fig. 6]
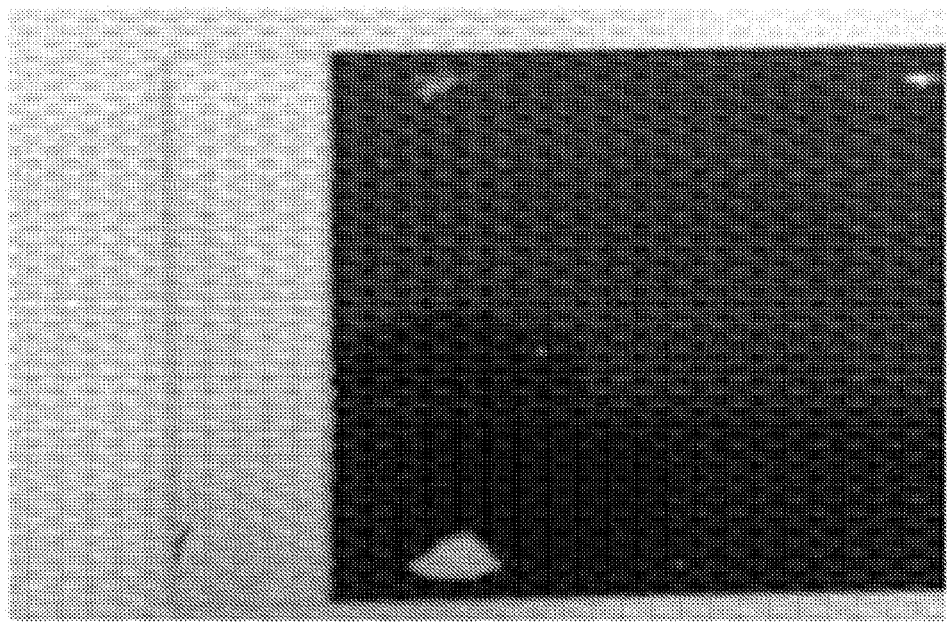

【Fig. 7】
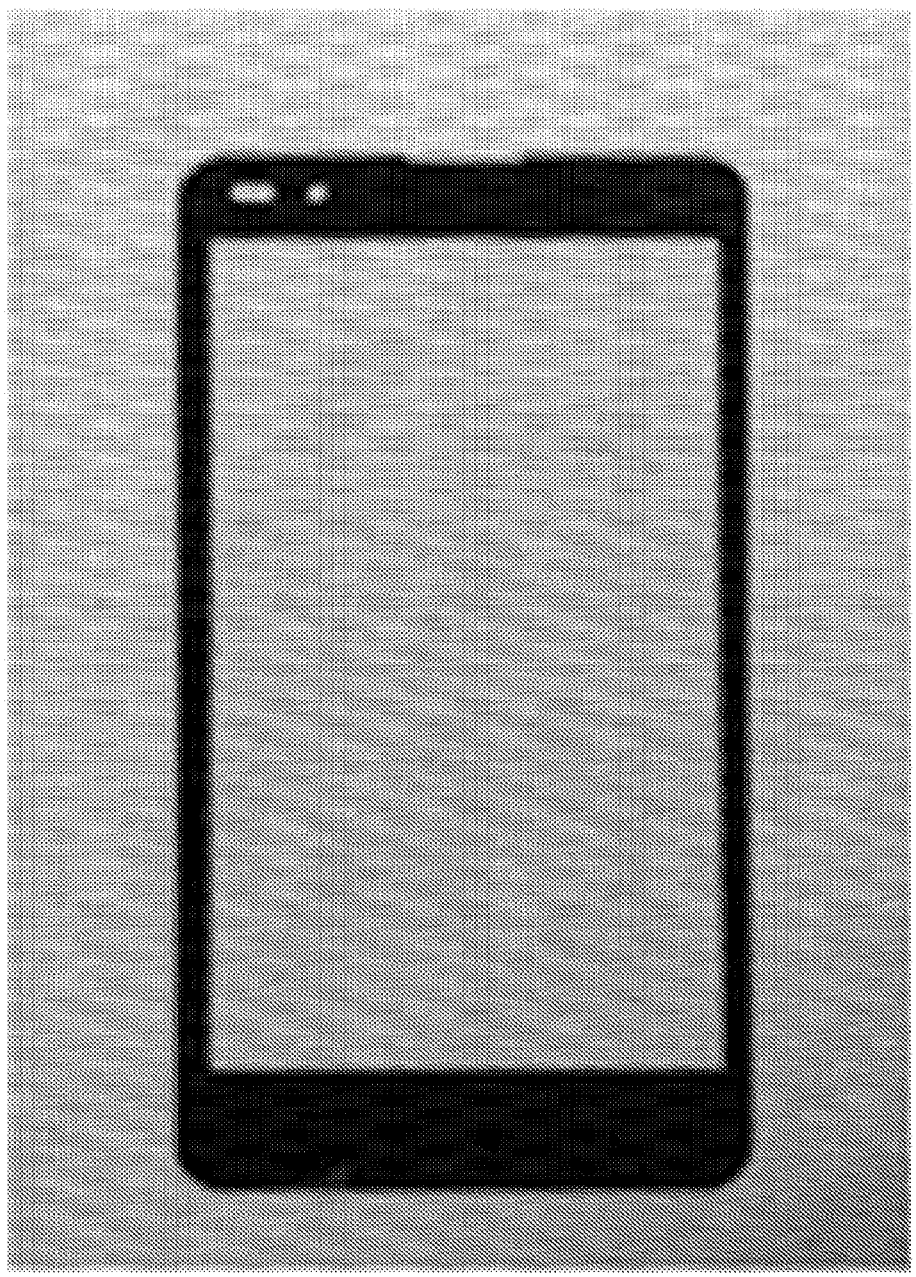

METHOD FOR FORMING BEZEL PATTERN OF DISPLAY SUBSTRATE

This application is a divisional of, and claims priority to, U.S. patent application Ser. No. 14/365,010, filed on Jun. 12, 2014, which is a 35 USC § 371 National Stage entry of International Application No. PCT/KR2013/006007, filed on Jul. 5, 2013, which claims priority from Korean Patent Application No. 10-2012-0075670, filed on Jul. 11, 2012, in the Korean Intellectual Property Office, all of which are incorporated herein by reference in its entirety.

TECHNICAL FIELD

The present application relates to a method for forming a bezel pattern of a display panel, a release film used in the method for forming a bezel pattern of a display panel, a display panel including the release film, and an electronic device including a display panel manufactured by using the release film.

BACKGROUND ART

In a display panel, a photolithography method or a screen printing method has been used in order to form a bezel pattern in the related art, but a process for forming a pattern is complicated, the manufacturing cost thereof is expensive, or there is a problem in the performance.

Thus, there is a need for developing a method which is simpler than the method for forming a bezel pattern in the related art and may improve the performance thereof while reducing the costs thereof.

DISCLOSURE

Technical Problem

The present application has been made in an effort to provide a method for forming a bezel pattern of a display panel, which may reduce the costs thereof or may improve the performance of the display panel by improving process efficiency or simplifying the process.

Technical Solution

An exemplary embodiment of the present application provides a method for forming a bezel pattern of a display panel, the method including: attaching a release film including a non-pattern portion and having adhesion to a panel; printing at least one bezel pattern by applying an ink composition on the panel; and removing the release film from the panel.

Another exemplary embodiment of the present application provides a release film used in the method for forming a bezel pattern of a display panel.

Still another exemplary embodiment of the present application provides a release film for forming a bezel pattern of a display panel including a non-pattern portion.

Yet another exemplary embodiment of the present application provides a display panel including the release film.

Still yet another exemplary embodiment of the present application provides an electronic device including a display panel manufactured by using the release film.

Advantageous Effects

The method for forming a bezel pattern of a display panel according to an exemplary embodiment of the present application may improve the process efficiency or may improve the performance of the display panel.

DESCRIPTION OF DRAWINGS

FIG. 1 illustrates a release film including a pattern portion and a non-pattern portion, which are separable from each other according to an exemplary embodiment of the present application.

FIG. 2 illustrates a panel from which a release film of a pattern portion is removed after the release film is attached to the panel according to an exemplary embodiment of the present application.

FIG. 3 illustrates a panel for printing a plurality of bezel patterns on one panel according to an exemplary embodiment of the present application.

FIG. 4 illustrates a bezel pattern which is a printed material from which a release film is removed after printing according to an exemplary embodiment of the present application.

FIG. 5 illustrates a bezel pattern printed according to Example 1.

FIG. 6 illustrates a bezel pattern printed according to Example 2.

FIG. 7 illustrates a bezel pattern printed according to Example 3.

MODE FOR INVENTION

The advantages and features of the present application, and methods of accomplishing the advantages and features will become obvious with reference to exemplary embodiments to be described below in detail along with the accompanying drawings. However, the present application is not limited to the exemplary embodiments to be disclosed below, but will be implemented in various forms different from each other. The exemplary embodiments are merely intended to make the disclosure of the present application complete and to completely notify the person with ordinary skill to which the present application pertains of the scope of the invention, and the present application is only defined by the scope of claims. The size and relative size of the constituent elements marked in the drawings may be exaggerated for clarity of description.

Unless otherwise defined, all terms including technical and scientific terms used in the present specification may be used as the meaning which may be commonly understood by the person with ordinary skill in the art to which the present application pertains. Terms defined in commonly used dictionaries should not be interpreted in an idealized or excessive sense unless clearly and particularly defined.

Hereinafter, the present application will be described in detail.

A "bezel" used in the present specification means at least one border portion included in a display panel. The bezel may be included in a region other than an effective screen portion. Further, a sensor portion, a camera portion, a logo portion, a button portion, or an open portion may be included in the border portion region.

A "bezel pattern" used in the present specification means a pattern formed in the bezel portion. The bezel pattern may be included in other regions such as the sensor portion, the camera portion, the logo portion, the button portion, or the open portion. The bezel pattern may also be a design pattern or a black matrix pattern.

An exemplary embodiment of the present application provides a method for forming a bezel pattern of a display panel, the method including: attaching a release film including a non-pattern portion and having adhesion to a panel; printing at least one bezel pattern by applying an ink composition on the panel; and removing the release film from the panel.

In an exemplary embodiment of the present application, the release film further includes a pattern portion, and the pattern portion may be separable from a non-pattern portion.

FIG. 1 illustrates a release film 10 in which a pattern portion 20 and a non-pattern portion 30 are cut according to an exemplary embodiment of the present application.

In an exemplary embodiment of the present application, the method may further include removing the release film of the pattern portion from the panel after attaching a release film including a pattern portion which is separable from a non-pattern portion to the panel.

In an exemplary embodiment of the present application, it is preferred that in a release film, adhesion of the non-pattern portion is equal to or greater than that of the pattern portion.

An adhesion of the non-pattern portion may be equal to that of the pattern portion as long as the non-pattern portion and the pattern portion are separable from each other. As an example, the adhesion of the non-pattern portion may be equal to that of the pattern portion as long as a boundary line between the non-pattern portion and the pattern portion is formed in the form of a stitch and thus the non-pattern portion and the pattern portion are easily separable. As another example, the adhesion of the non-pattern portion may be equal to that of the pattern portion as long as the thickness of the boundary line between the non-pattern portion and the pattern portion is 1% to 90% of the thickness of a region other than the boundary line and thus the non-pattern portion and the pattern portion are easily separable from boundary line.

In addition, since a release film of the pattern portion in the non-pattern portion and the pattern portion is first removed, a pattern is printed on a panel, and then a release film of the non-pattern portion is removed, the adhesion of the portion which is removed later may be greater than that of the portion which is removed first.

In an exemplary embodiment of the present application, in removing the release film of the pattern portion from the panel, the pattern portion may be mechanically removed by making the adhesion of the pattern portion weaker than that of the non-pattern portion, or may be removed by being immersed in a specific solvent. Alternatively, it is possible to use a method of applying heat to, irradiating laser on, or irradiating UV on the pattern portion.

FIG. 2 illustrates that a release film of a pattern portion is removed after attaching the release film 10 to a panel 40 according to an exemplary embodiment of the present application.

In an exemplary embodiment of the present application, the release film may have a thickness of 100 µm or less, specifically from 1 µm to 50 µm, and more specifically from 1 µm to 30 µm. In order to enhance the sharpness of the pattern edge, it is preferred that the thickness is 100 µm or less. When the thickness is 1 µm or more, solvent resistance to a printing composition is excellent during printing.

In an exemplary embodiment of the present application, the release film may include a substrate film, and an adhesive layer.

According to an exemplary embodiment of the present application, the substrate film may be a plastic film. Specifically, the substrate film may be a polyester-based film, a polyolefin-based film, a polyimide-based film, a nylon-based film, or a mixed resin film thereof, and more specifically may be a film selected from the group consisting of polyethyleneterephthalate (PET), polybutyleneterephthalate (PBT), polyethylenenaphthalate (PEN), polybutylenenaphthalate (PBN), polyethylene (PE), polypropylene (PP), polyimide (PI), nylon, and a mixed resin thereof.

In an exemplary embodiment of the present application, the adhesive layer needs to have solvent resistance, chemical resistance, and oil resistance in order for a composition for printing not to penetrate into the inner side of a protective film during printing. For example, it is possible to use an acrylic, silicone-based, or urethane-based adhesive as the adhesive layer.

In an exemplary embodiment of the present application, the non-pattern portion may be a portion including one or two or more selected from the group consisting of an effective screen portion, a sensor portion, a camera portion, a logo portion, a button portion, and an open portion.

In an exemplary embodiment of the present application, the method for forming a bezel pattern may be a method for printing one bezel pattern on one panel, or a method for printing two or more bezel patterns on one panel.

In an exemplary embodiment of the present application, when one bezel pattern is printed on one panel, a release film may be attached to a panel which is cut in advance. In this case, an additional process of alignment may be needed in attaching the release film.

In an exemplary embodiment of the present application, when one bezel pattern is printed on one panel, a panel which is not cut in advance may also be used in attaching the release film on the panel. In this case, the method may further include cutting a panel according to the form of the bezel pattern after printing the bezel pattern.

According to an exemplary embodiment of the present application, in order to print two or more bezel patterns on one panel, the method may further include cutting a panel according to the form of the bezel pattern after printing the bezel pattern.

The method for forming a bezel pattern according to an exemplary embodiment of the present application may include removing the release film from the panel after cutting the panel according to the form of the bezel pattern after printing the bezel pattern.

The method for forming a bezel pattern according to an exemplary embodiment of the present application may include cutting the panel according to the form of the bezel pattern after removing the release film from the panel after printing the bezel pattern.

FIG. 3 illustrates a panel for printing a plurality of bezel patterns on one panel. When each panel is cut according to the form of the bezel pattern after the bezel pattern is printed as in FIG. 3, there is an advantage in that an additional process of alignment is not needed.

In printing the bezel pattern according to an exemplary embodiment of the present application, an ink composition may be applied on an entire surface or a part of the panel.

In printing a bezel pattern according to an exemplary embodiment of the present application, the printed pattern may have a line height (height) from 0.5 µm to 10 µm, specifically from 0.5 µm to 5 µm. When a bezel pattern is printed using a screen printing method in the related art, the line height of the bezel pattern is 20 µm or more, and therefore, the level difference is high. Therefore, since cracks are frequently generated by the high level difference, there is a disadvantage in that the performance of a display may deteriorate. However, when the method of the present application is used, it is possible to implement a line height from 0.5 µm to 10 µm, and therefore, there is an advantage in that the performance of a display may be improved because cracks are scarcely generated.

A printing method is not particularly limited in printing a bezel pattern according to an exemplary embodiment of the present application. Specifically, it is possible to use a method selected from the group consisting of spin coating, reverse offset, ink jet printing, gravure coating, micro gravure coating, kiss gravure coating, comma knife coating, roll coating, spray coating, Meyer bar coating, and slit die coating.

In the panel according to an exemplary embodiment of the present application, removing the release film may remove a release film of a non-pattern portion. Specifically, a remaining release film after printing may be mechanically removed, removed by being attached to an adhesive tape, or removed by being immersed in a specific solution. Alternatively, it is possible to use a method of applying heat to, irradiating laser on, or irradiating UV on the remaining release film after printing.

FIG. 4 illustrates a bezel pattern which is a printed material from which a release film is removed after printing according to an exemplary embodiment of the present application.

An exemplary embodiment of the present application provides a release film used in the method for forming a bezel pattern of a display panel.

An exemplary embodiment of the present application provides a release film for forming a bezel pattern of a display panel including a non-pattern portion. The release film further includes a pattern portion, and the pattern portion may be separable from a non-pattern portion. The description on the release film is as described above.

An exemplary embodiment of the present application provides a display panel including the release film.

Examples of the display panel include a plasma display panel (PDP), a liquid crystal display (LCD) panel, an electrophoretic display panel, a cathode-ray tube (CRT) panel, an OLED display panel, or various touch panels.

An exemplary embodiment of the present application provides an electronic device including a display panel manufactured by using the release film.

Hereinafter, the present application will be described in more detail through Examples and Comparative Example. However, the following Examples and Comparative Example are provided for illustrative purposes only, and the scope of the present application is not limited thereby.

Example 1

A release film having a thickness of 20 μm, which had been cut in advance, was attached to a pattern surface of glass, and then the release film of a pattern portion was removed. At this time, a method of removing the release film of the pattern portion by attaching to an adhesive tape was used. An entire surface of a printed material to which the release film was attached was coated using a spin coater. At this time, the line height of the pattern was measured as 1 μm. Thereafter, the release film of a non-pattern portion was removed. At this time, a method of removing the release film of the non-pattern portion by attaching to an adhesive tape was used. FIG. 5 illustrates a bezel pattern printed according to Example 1.

Example 2

A release film having a thickness of 20 μm, which had been cut in advance, was attached to a pattern surface of glass, and then the release pattern of a pattern portion was removed. At this time, a method of removing the release film of the pattern portion by attaching to an adhesive tape was used. A printing material was coated on an entire surface of a silicone blanket using a Mayer bar. The blanket with the entire surface coated with the printing material was brought into contact with a pattern surface of glass to which the release film was attached, and then transferred thereon. At this time, the line height of the pattern was measured as 1 μm. Thereafter, the release film of the non-pattern portion was removed. At this time, a method of removing the release film of the non-pattern portion by attaching to an adhesive tape was used. FIG. 6 illustrates a bezel pattern printed according to Example 2.

Example 3

A release film having a thickness of 20 μm, which had been cut in advance, was attached to a pattern surface of glass, and then the release film of a pattern portion was removed. At this time, a method of removing the release film of the pattern portion by attaching to an adhesive tape was used. A printing material was coated on an entire surface of a silicone blanket using an off set apparatus, and then the blanket coated with the printing material was brought into contact with a pattern surface of glass to which the release film was attached, and then transferred thereon. At this time, the line height of the pattern was measured as 0.5 μm. Thereafter, the release film of the non-pattern portion was removed. At this time, a method of removing the release film of the non-pattern portion by attaching to an adhesive tape was used. FIG. 7 illustrates a bezel pattern printed according to Example 3. It could be confirmed that a clearer bezel pattern was formed compared to Example 1 using a spin coating method or Example 2 using a Mayer bar coating method.

Comparative Example 1

A bezel pattern was formed on glass through a screen printing method. At this time, the line height of the pattern was measured as 15 μm.

When the line height of the pattern is high, a short circuit occurs and cracks are generated due to the level difference, thereby leading to deterioration of durability. Furthermore, an optical adhesive may also be used in order to alleviate the level difference, but at this time, there is a problem in that a product appears dull because the product becomes thick.

Further, bubbles may be generated by a level difference occurring due to a pattern line height during a lamination work of a panel and various films. When bubbles are generated, a high temperature and high pressure process may be required in order to remove bubbles, and bubbles may not be removed even at high temperature and high pressure, which is problematic.

It is understood by a person with ordinary skill in the art to which the present application pertains that various applications and modifications may be made within the scope of the present application based on the contents.

Although the specific part of the present application has been described in detail, it is obvious to those skilled in the art that such a specific description is just a preferred embodiment and the scope of the present application is not limited thereto. Thus, the substantial scope of the present application will be defined by the appended claims and equivalents thereto.

DESCRIPTION OF REFERENCE NUMERALS

10: Release film
20: Pattern portion
30: Non-pattern portion
40: Display panel

The invention claimed is:

1. A release film for forming a bezel pattern of a display panel, the release film comprising:
   a non-pattern portion,
   a pattern portion defining the outermost periphery of the release film, wherein the pattern portion comprises at least one of: a sensor portion, a camera portion, and a button portion, and
   a boundary line of reduced thickness between the non-pattern portion and the pattern portion,
   wherein the pattern portion is separable from the non-pattern portion along the boundary line, and defines a removable border surrounding the non-pattern portion, and is configured and arranged to permit printing of the bezel pattern of the display after being separated and removed from the non-pattern portion,
   wherein in the release film, adhesion of the non-pattern portion is equal to or greater than that of the pattern portion.

2. A display panel comprising the release film of claim 1.

3. An electronic device comprising a display panel manufactured by using the release film of claim 1.

4. The release film of claim 1, wherein the release film has a thickness of 100 µm or less.

5. The release film of claim 4, wherein the thickness is 1 µm to 50 µm.

6. The release film of claim 1, wherein the release film comprises a substrate film, the substrate film comprising a polyester-based film, a polyolefin-based film, a polyimide-based film, a nylon-based film, polyethyleneterephthalate, polybutyleneterephthalate, polyethylenenaphthalate, polybutylenenapthalate, polyethylene, polypropylene, or mixtures thereof.

7. The release film of claim 1, wherein the release film comprises an adhesive layer, the adhesive layer comprising acrylic, silicone, or urethane.

* * * * *